United States Patent [19]

Haas et al.

[11] Patent Number: 4,480,125
[45] Date of Patent: Oct. 30, 1984

[54] ITACONAMIDE COMPOUNDS AND METHOD OF PREPARATION

[75] Inventors: Howard C. Haas, Arlington; Stanley J. Jasne, Andover, both of Mass.; Robert D. Moreau, Nashua, N.H.

[73] Assignee: Polaroid Corporation, Cambridge, Mass.

[21] Appl. No.: 322,066

[22] Filed: Nov. 16, 1981

[51] Int. Cl.$^3$ ............................................. C07C 102/00
[52] U.S. Cl. ..................... 564/144; 260/463; 564/133; 564/155; 564/160
[58] Field of Search ............... 564/133, 144, 155, 160

[56] References Cited

U.S. PATENT DOCUMENTS

| | | | |
|---|---|---|---|
| 2,531,408 | 11/1950 | D'Alelio | 260/78.5 |
| 2,713,574 | 7/1955 | Vaughan, Jr. | 564/144 X |
| 2,715,119 | 8/1955 | Wieland et al. | 564/144 X |
| 2,794,787 | 6/1956 | Coover, Jr. | 260/8 |
| 3,236,613 | 2/1966 | Gee et al. | 564/160 X |
| 3,239,491 | 3/1966 | Tson et al. | 260/78 |

FOREIGN PATENT DOCUMENTS

| | | |
|---|---|---|
| 2228063 | 12/1973 | Fed. Rep. of Germany . |
| 2422375 | 11/1974 | Fed. Rep. of Germany . |
| 917958 | 2/1963 | United Kingdom . |
| 956253 | 4/1964 | United Kingdom . |
| 1001666 | 8/1965 | United Kingdom . |
| 1002343 | 8/1965 | United Kingdom . |
| 1063573 | 3/1967 | United Kingdom . |
| 1167161 | 10/1969 | United Kingdom . |
| 1167162 | 10/1969 | United Kingdom . |

OTHER PUBLICATIONS

Strecker, Chem. Ber., 15, 1640 (1882).
Scarborough et al., J. Org. Chem., 26, 4955 (1961).
Hiroyoshi, J. Chem. Soc. Japan, vol. 69, No. 7, 1416 (1966).
Ishida et al., J. Polym. Sci.: Part A-1, vol. 5, 689 (1967).
Kirk-Othmer, Encyclopedia of Chemical Technology, 3rd Ed., vol. 13, John Wiley & Sons, N.Y. (1970), p. 866.
Tate, Itaconic Acid, Itaconic Esters, and Related Compounds, High Polymers, vol. 24, Part I, Leonard, Ed., Wiley & Sons, N.Y. (1970), pp. 210, 211, 234.

*Primary Examiner*—Thomas A. Waltz
*Attorney, Agent, or Firm*—Louis G. Xiarhos

[57] ABSTRACT

The present invention relates to itaconamide compounds of the formula

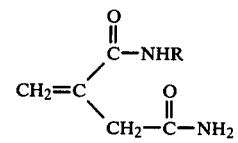

wherein R is hydrogen, alkyl, aryl, alkaryl, or aralkyl and to a method of preparing the subject compounds which comprises preparing a mixed anhydride of 2-methylenesuccinamic acid and reacting the mixed anhydride with a compound of the formula RNH$_2$, wherein R is as previously defined, to provide the corresponding itaconamide compound.

9 Claims, No Drawings

ITACONAMIDE COMPOUNDS AND METHOD OF PREPARATION

BACKGROUND OF THE INVENTION

The present invention relates to itaconamide, N-substituted itaconamides, and a method of preparing same.

Itaconamide, which has the structure

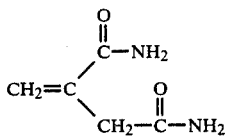

has been reported as being capable of preparation by ammonolysis of either dimethylitaconate or diethylitaconate. O. Strecker, Chem. Ber., 15, 1640 (1882), reports the synthesis of itaconamide by this method in an aqueous medium, the product having a melting point of 192° C. British Pat. No. 917,958, published Feb. 13, 1963, also purports to prepare itaconamide by this method, employing substantially dry gaseous ammonia in the presence of certain substantially dry alkanols. The reported melting point of the product is 193°–194° C. The latter procedure was also employed by S. Ishida et al., J. Polym. Sci.: Part A-1, 5, 689 (1967) to produce "itaconic diamide" having a melting point of 195.4°–196.5° C.

It has been shown that the reaction of dimethyl- or diethylitaconate with ammonia does not produce itaconamide. Instead, the reaction has been shown to produce 2-pyrrolidone-4-carboxylic acid amide,

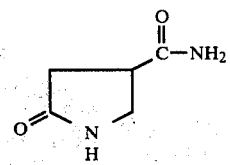

which has a melting point of about 193°–195° C. Scarborough et al., J. Org. Chem., 26, 4955 (1961), report the production of this cyclic compound upon reaction of anhydrous ammonia with dimethylitaconate in absolute methanol. Hiroyoshi, J. Chem. Soc. Jap., vol. 69, No. 7, 1416, (1966), confirms this result for reactions conducted in both aqueous and alcoholic media. Further reference to the production of 2-pyrrolidone-4-carboxylic acid amide by the reaction of dimethyl- or diethylitaconate with ammonia is found in Kirk-Othmer, Encyclopedia of Chemical Technology, 3rd ed., vol. 13, John Wiley and Sons, New York, (1970) at p. 866 and Tate, Itaconic Acid, Itaconic Esters, and Related Compounds, High Polymers, vol. 24, Part 1, E. Leonard Ed., John Wiley and Sons, New York (1970) at pp. 210–211.

German OLS No. 2,422,375, opened to public inspection Nov. 28, 1974, purports to prepare itaconic acid and certain of its derivatives, including itaconamide. Repeated attempts by the present applicants to apply the method of the patent to the preparation of itaconamide were unsuccessful.

Patents which refer to itaconamide as a copolymerizable monomers are U.S. Pat. Nos. 2,531,408; 2,794,787; and 3,239,491; British Pat. Nos. 1,001,666; 1,002,343; 1,063,573; 1,167,161; and 1,167,162; German OLS No. 2,228,063; and French Pat. No. 1,421,926. None of the cited patents provides a method of preparing itaconamide, indicates procedures by which the compound may have been prepared, or provides any characterization of the compound.

SUMMARY OF THE INVENTION

In accordance with the present invention, itaconamide, N-substituted itaconamides, and a method of preparing same are presented to the art. The present invention accordingly relates to itaconamide compounds of the formula

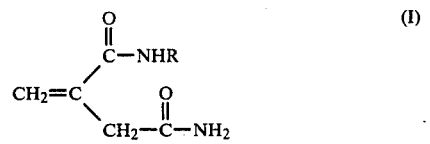 (I)

wherein R is hydrogen, alkyl, aryl, alkaryl or aralkyl. The present invention also relates to a method for preparing the compounds of formula (I) which comprises the steps of reacting 2-methylenesuccinamic acid with an alkyl or aryl haloformate in an aprotic organic solvent to provide the corresponding mixed anhydride, and reacting the mixed anhydride with a compound of the formula $RNH_2$, wherein R is hydrogen, alkyl, aryl, alkaryl, or aralkyl, to provide the corresponding itaconamide compound of formula (I).

The compounds of this invention can be polymerized to provide homopolymers or copolymers which can be used to prepare films, filaments, and protective coatings.

DETAILED DESCRIPTION OF THE INVENTION

As stated above, the compounds of this invention are itaconamide compounds of the formula

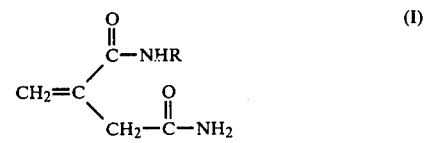 (I)

wherein R is hydrogen; alkyl, e.g., methyl, ethyl, n-propyl, n-butyl, isopropyl, isobutyl, or cyclohexyl; aryl, e.g., phenyl, p-methoxyphenyl; alkaryl, e.g., tolyl; or aralkyl, e.g., benzyl.

It has been found that the subject compounds can be prepared by the above-described method wherein a mixed anhydride of 2-methylenesuccinamic acid is converted by reaction with ammonia or a primary amine to the corresponding itaconamide compound. The method of preparation is illustrated in the following reaction scheme wherein R is hydrogen, alkyl, aryl, alkaryl, or aralkyl; $R^1$ is alkyl or aryl; and X is halo, e.g., chloro or bromo:

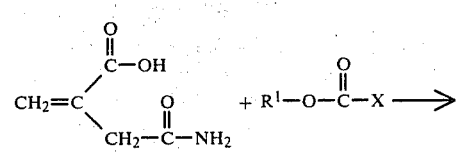

-continued

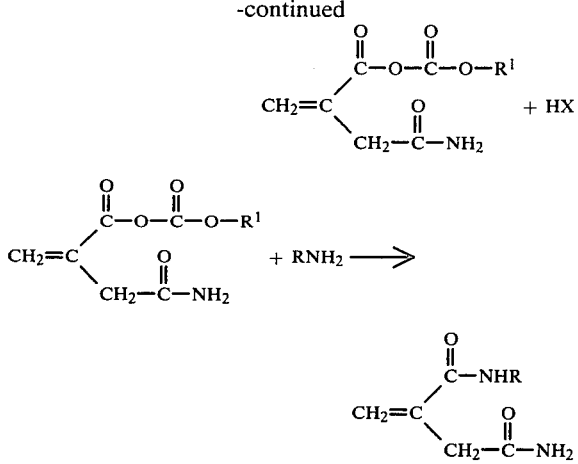

The use of ammonia in the above reaction scheme (R=hydrogen) provides itaconamide per se, i.e.,

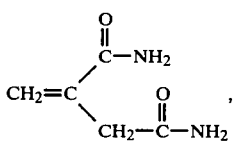

as the final product whereas use of a primary amine (R=alkyl, aryl, alkaryl, or aralkyl), e.g., methyl amine, aniline, benzyl amine, or p-toluidine, provides the corresponding N-substituted itaconamide, e.g.

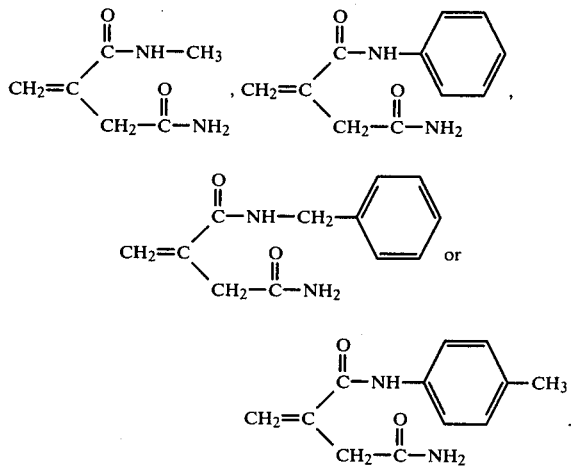

The mixed anhydride intermediate

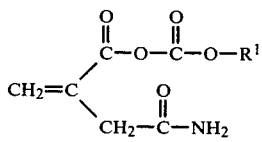

is a novel compound. If desired, it may be isolated prior to reaction with the ammonia or primary amine, e.g., by evaporation of the aprotic solvent or by precipitation into a non-solvent for the mixed anhydride. However, due to the reactive nature of mixed anhydrides, it is preferred to react the mixed anhydride with the ammonia or primary amine without prior isolation. Thus, in a preferred practice, the mixed anhydride is prepared by reaction of 2-methylenesuccinamic acid with an alkyl or aryl haloformate in an aprotic organic solvent and the ammonia or primary amine is then added to the resultant mixed anhydride solution. The ammonia can be added by bubbling substantially dry ammonia gas into the mixed anhydride solution. The primary amine can be added in a liquid or solid state or dissolved in a substantially anhydrous aprotic organic solvent which is the same as or miscible with the aprotic organic solvent used for mixed anhydride formation.

The use of the mixed anhydride compound as the intermediate material reacted with ammonia or a primary amine has been found to be highly advantageous in that the mixed anhydride is highly reactive and provides a leaving group,

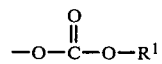

which is readily displaced by ammonia or a primary amine, thereby permitting formation of the desired itaconamide compounds. In contrast, attempts at ammonolysis of the methyl ester of 2-methylenesuccinamic acid in chloroform or diethyl ether, for example, resulted in the recovery of starting material.

In general, satisfactory formation of the mixed anhydride is achieved by reaction of 2-methylenesuccinamic acid with about one equivalent of the alkyl or aryl haloformate, although the haloformate may be used in moderate excess as necessary to obtain optimum yields. Any of the known alkyl or aryl haloformates may be used in the present invention, including ethylchloroformate, isobutyl chloroformate, propyl bromoformate, benzyl iodoformate, and the like.

The reaction of 2-methylenesuccinamic acid and the alkyl or aryl haloformate is preferably carried out by gradually adding a solution of the alkyl or aryl haloformate in an aprotic organic solvent to a solution of 2-methylenesuccinamic acid in an aprotic organic solvent at a relatively low temperature of less than 0° C., most preferably in the range of about −60° C. to about −15° C. The rate of addition of the haloformate solution should be sufficiently slow to permit maintenance of the relatively low solution temperature.

In a preferred practice, mixed anhydride preparation is conducted in the presence of an organic base such as triethylamine or pyridine. Most preferably, an amount of organic base equal to about one equivalent of 2-methylenesuccinamic acid is employed and is added to a solution of the 2-methylenesuccinamic acid prior to the addition of the haloformate. While the mixed anhydride can be prepared in the absence of such a base, the presence of the base generally facilitates the reaction and provides an optimum yield of product.

As used herein, the term "aprotic organic solvent" is used in its ordinary sense and, thus refers to an organic solvent which is substantially incapable of acting as a proton donor. Preferred aprotic organic solvents for use in the present process are low polarity aprotic solvents such as methylene chloride, chloroform, carbon tetrachloride, dioxane, or benzene. In general, utilization of a low polarity aprotic solvent will promote precipitation of the product itaconamide or N-substituted itaconamide, thereby minimizing further reaction of the product and facilitating its isolation.

Solvents used in conducting the method of this invention, including solvents used to dissolve a primary amine reagent, should be substantially anhydrous. In this regard, precautions should be taken as necessary to insure maintenance of anhydrous reaction conditions such as appropriate use of condenser drying tubes to maintain an anhydrous atmosphere and desiccants to remove trace amounts of water from solvents, primary amine solutions, and ammonia gas.

Primary amines which can be reacted with the mixed anhydride to prepare the N-substituted itaconamides of this invention include methylamine, ethylamine, n-propylamine, isopropylamine, n-butylamine, isobutylamine, benzylamine, aniline, α-phenethylamine, p-toluidine, p-anisidine, cyclohexylamine, and the like. In general, satisfactory production of the N-substituted itaconamide can be achieved by use of an equivalent amount or moderate excess of the primary amine, e.g., a 5–15% excess on an equivalent basis, although larger excesses may be used as necessary to obtain satisfactory yields. The primary amine is preferably added to the mixed anhydride solution at a relatively low temperature, most preferably in the range of about −15° C. to about 15° C., although higher temperatures may be employed as necessary to achieve satisfactory solubilization of the primary amine or satisfactory reaction rates.

The addition of ammonia gas to the mixed anhydride solution is also preferably carried out at a solution temperature of about −15° C. to about 15° C.

Subsequent to addition of the primary amine or ammonia, the reaction mixture may be warmed to higher temperatures.

If soluble in the reaction solvent, the product itaconamide compound may be isolated by evaporation of the solvent or by precipitation into a non-solvent for the product compound. As indicated above, the use of a low polarity reaction solvent will generally promote precipitation of the itaconamide compound from the reaction mixture such that it can be isolated by simple filtration methods. If necessary, purification of the product can be effected by conventional methods, e.g., chromatography or recrystallization.

2-Methylenesuccinamic acid is a known material which can be prepared by reaction of ammonia with itaconic anhydride in chloroform in accordance with the method of Zilkha et al., J. Org. Chem, 28, 2007 (1963).

The compounds of this invention are addition polymerizable monomers which can be used in preparation of homopolymers and copolymers. Polymers prepared from these monomers can be used to form films, fibers, and protective coatings.

The following examples are provided to further illustrate the present invention. Specific limitations set forth in the examples are intended as illustrative and not limitative.

EXAMPLE 1

Preparation of 2-methylenesuccinamic acid 250 grams of itaconic anhydride were added to 4.25 l. of chloroform and the resultant mixture stirred at room temperature and then filtered. The filtrate was cooled to about 0° C. and ammonia gas was bubbled in with stirring causing formation of a precipitate. The ammonia gas was bubbled in continuously until precipitate formation ceased. The precipitate was collected by filtration, washed with chloroform, and air-dried overnight. 250 grams of the precipitate were obtained. 60 grams of the precipitate were dissolved in about 60 ml. of water and the solution was cooled to about 10° C. About 15 ml. of concentrated hydrochloric acid were added slowly, effecting precipitation of crude 2-methylenesuccinamic acid. The product was collected by filtration and air-dried, yielding about 20 g. The filtrate was further acidified by addition of 15 ml. of concentrated hydrochloric acid, causing formation of additional precipitate. This was collected by filtration and air-dried, yielding an additional 20 g. of crude 2-methylenesuccinamic acid. The two 20 g. samples were combined and recrystallized from 55 ml. of isopropanol, yielding about 24 g. of product melting at 134°–139° C. This product was recrystallized from 75 ml. of ethanol, yielding about 16.8 g. of 2-methylenesuccinamic acid, m.p.=145°–148° C.

EXAMPLE 2

Preparation of itaconamide 38.7 grams (0.3 mole) of 2-methylenesuccinamic acid, prepared as described in Example 1, were dissolved in 150 ml of chloroform in a 500 ml. 3-necked round bottom flask equipped with a magnetic stirrer, condenser, drying tube, thermometer, and dropping funnel. The solution was cooled to about 5° C. and a mixture of 41.7 ml. (1 equivalent) of triethylamine and 90 ml. of chloroform was added dropwise over ½ hour to the stirring solution. The solution was then cooled to about −45° C. by means of a dry ice-acetone bath. A mixture of 28.5 ml. (1 equivalent) of ethyl chloroformate and 70 ml. of chloroform was added to the solution over a ½ hour period, maintaining the solution temperature at about −45° C. The reaction mixture was allowed to stir at −45° C., ±15° C., for an additional 2 hours. The reaction mixture was then transferred to a 1-liter 3-necked round bottom flask fitted with a mechanical stirrer, gas inlet, thermometer, condenser, and drying tube. The solution was maintained at −10° C. while ammonia gas was bubbled into the reaction mixture for ½ hour. Additional portions of chloroform, totaling 400 ml., were then added. The reaction mixture was allowed to warm to room temperature and the precipitated product was isolated by suction filtration and air-dried overnight. Repeated recrystallizations from water, methanol/water, and water gave 16.3 gms of itaconamide, a white solid melting at 226°–229° C.

The itaconamide was subjected to elemental analysis with the following results:

|  | C | H | N |
| --- | --- | --- | --- |
| Calculated for $C_5H_8N_2O_2$: | 46.82% | 6.29% | 21.87% |
| Found: | 46.82% | 6.34% | 21.76% |

Proton nuclear magnetic resonance, carbon-13 magnetic resonance, and infrared spectral analysis confirmed the structure of the product. The mass spectrum, obtained using a Micro Mass 7070E spectrometer at 70 E.V., showed a base peak at m/e 85. The parent ion had a relative intensity of 0.5%. At high source temperatures ion-molecule interactions cause a significant increase in the m/e 129 peak vs. the parent ion. Analysis of the itaconamide on a differential scanning calorimeter showed a melting endotherm at 230° C. with an exotherm immediately following the endotherm. The compound decolorized bromine and permanganate solutions.

The itaconamide could be recrystallized from water, aqueous methanol, dimethylformamide, dimethylsulfoxide/ethyl acetate, or formamide.

EXAMPLE 3

Homopolymerization of itaconamide

In a 50 ml. round bottom flask equipped with a stopcock adapter were placed 500 mg. of itaconamide, prepared as described in Example 2, 10 ml. of water, and 5 mg. of azobisisobutyronitrile. The contents were cooled in an ice-water bath, the flask was evacuated, and the stopcock was closed so as to maintain the internal vacuum. The flask was placed in a 65° C. bath for 12 days. The reaction mixture was then cooled to room temperature and the water was evaporated by blowing a stream of air across the surface. About 10 ml. of water were added to the residue, the resultant mixture was filtered, and the filtrate solution was evaporated to dryness. A hydroscopic, film-forming residue was obtained which was determined to be polyitaconamide by infrared spectral analysis.

EXAMPLE 4

Copolymerization of itaconamide and acrylic acid

In a 50 ml. round bottom blask equipped with a stopcock adapter were placed 216 mg. (3 equivalents) of acrylic acid, 128 mg. (1 equivalent) of itaconamide, prepared as described in Example 2, 10 mg. of 2,2'-azobis (2-amidinopropane) hydrochloride (available from Crescent Chemical Co., Inc., Hauppauge, N.Y. under the tradename V-50), and 10 ml. of water. The flask was evacuated and sealed as described in Example 3 and placed in a 65° C. bath for 10 days. The reaction mixture was then cooled to room temperature and the water evaporated by blowing a stream of air across the surface. The residue was dissolved in 50 ml. of water and the solution subjected to pressure filtration in an Amicon Cell #402 (available from Amicon Corp., Lexington, MA) fitted with an Amicon Filter UM-2 having a molecular weight cut-off of 1000. A concentrated polymer solution was obtained which was diluted with water and the pressure filtration process repeated. This process was repeated several times until essentially all low molecular weight impurities were removed. The resultant copolymer solution was evaporated to dryness to yield a copolymer of itaconamide/acrylic acid as a white solid. Infrared spectral analysis was consistent with the copolymer structure. Elemental analysis of nitrogen content indicated a molar percentage of itaconamide in the copolymer of 24%.

EXAMPLE 5

This Example describes an attempt by the present applicants to prepare itaconamide by the method of the previously referenced German OLS No. 2,422,375:

15.1 grams of succinamide, 2.97 g. of trioxane, 12.35 g. of potassium t-butoxide, and 70 ml. of t-butanol were placed in a bomb and heated for about 20 hours at 110° C. The bomb and its contents were allowed to cool to room temperature. The contents of the bomb consisted of a mixture of a liquid and a solid. A major portion of the solid was collected by filtration of the mixture. Solid adhering to the sides of the bomb was removed and isolated by adding 200 ml. of diethyl ether, scraping the sides of the bomb, and filtering the resultant, solid-liquid mixture. The two samples of solid material were then combined, washed with diethyl ether, and dried. The diethyl ether wash was combined with the liquid filtrates which were obtained from the filtrations.

The dried solid material was analyzed by nuclear magnetic resonance (NMR) analysis, using deuterated dimethylsulfoxide as a solvent, and by infrared spectral (IR) analysis of a KBr pellet sample. Based on comparison with the NMR and IR spectra of an authentic sample of itaconamide, the spectra which were obtained did not evidence the formation of itaconamide.

The combined filtrate-diethyl ether wash was evaporated under a stream of nitrogen yielding a white solid residue. The residue was analyzed by NMR in deuterated dimethylsulfoxide and the spectrum which was obtained also did not evidence the formation of itaconamide.

What is claimed is:

1. A method for preparing an itaconamide compound of the formula

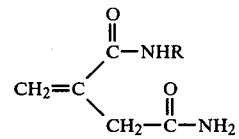

wherein R is hydrogen, alkyl, aryl, alkaryl, or aralkyl comprising the steps of reacting 2-methylenesuccinamic acid with an alkyl or aryl haloformate in an aprotic organic solvent to provide the corresponding mixed anhydride and reacting said mixed anhydride with a compound of the formula $RNH_2$, wherein R is hydrogen, alkyl, aryl, alkaryl, or aralkyl, to provide the corresponding itaconamide compound.

2. A method of claim 1 wherein said mixed anhydride is reacted with ammonia.

3. A method of claim 1 wherein said 2-methylenesuccinamic acid is reacted with said alkyl or aryl haloformate in the presence of an organic base.

4. A method of claim 3 wherein said 2-methylenesuccinamic acid is reacted with ethylchloroformate in the presence of about one equivalent of triethylamine.

5. A method of claim 4 wherein said mixed anhydride is reacted with ammonia.

6. A method of claim 5 wherein said aprotic organic solvent is chloroform.

7. A method of claim 1 wherein said aprotic organic solvent is a low polarity solvent in which said itaconamide compound is substantially insoluble.

8. A method of claim 1 wherein said 2-methylenesuccinamic acid is reacted with said alkyl or aryl haloformate at a temperature in the range of about −60° C. to about −15° C.

9. A method of claim 8 wherein said compound $RNH_2$ is added to a solution of said mixed anhydride at a temperature in the range of about −15° C. to about 15° C.

* * * * *